US009793828B2

(12) United States Patent
Masaki et al.

(10) Patent No.: US 9,793,828 B2
(45) Date of Patent: Oct. 17, 2017

(54) VIBRATION POWER GENERATOR

(71) Applicant: OMRON Corporation, Kyoto-shi, Kyoto (JP)

(72) Inventors: Tatsuakira Masaki, Kyoto (JP); Misato Nabeto, Nara (JP); Keiki Matsuura, Nara (JP)

(73) Assignee: OMRON Corporation, Kyoto (JP)

( * ) Notice: Subject to any disclaimer, the term of this patent is extended or adjusted under 35 U.S.C. 154(b) by 479 days.

(21) Appl. No.: 14/411,798

(22) PCT Filed: Jun. 19, 2013

(86) PCT No.: PCT/JP2013/066860
§ 371 (c)(1),
(2) Date: Dec. 29, 2014

(87) PCT Pub. No.: WO2014/010385
PCT Pub. Date: Jan. 16, 2014

(65) Prior Publication Data
US 2015/0145333 A1    May 28, 2015

(30) Foreign Application Priority Data
Jul. 10, 2012    (JP) ................................ 2012-155089

(51) Int. Cl.
*H02N 1/00*    (2006.01)
*H02N 1/08*    (2006.01)
*H02N 1/10*    (2006.01)

(52) U.S. Cl.
CPC ................. *H02N 1/10* (2013.01); *H02N 1/08* (2013.01); *Y10T 307/406* (2015.04)

(58) Field of Classification Search
CPC ............... H02N 1/00; H02N 1/08; H02N 1/10
(Continued)

(56) References Cited

U.S. PATENT DOCUMENTS 5,534,740 A * 7/1996 Higuchi ................. H02N 1/004
                                                310/309
8,018,119 B2 * 9/2011 Matsubara ............... H02N 1/08
                                                310/309
(Continued)

FOREIGN PATENT DOCUMENTS

CN      101197548 A     6/2008
JP      2011-188725    * 9/2011    ............... H02N 1/00
(Continued)

OTHER PUBLICATIONS

S.W.Liu et al., "Sandwich structured electrostatic/electrets parallel-plate power generator for low acceleration and low frequency vibration energy harvesting" IEEE 25th International Conference on Micro Electro Mechanical Systems (MEMS), 2012.*
(Continued)

*Primary Examiner* — Burton Mullins
(74) *Attorney, Agent, or Firm* — Osha Liang LLP (57) ABSTRACT

Power generated by a vibration power generator using an electret is efficiently supplied to a power supply load. A vibration power generator includes a first substrate and a second substrate configured to be moved relative to each other by external vibration while remaining opposite each other, a group of a plurality of electrets arranged in the relative movement direction on one surface side of the first substrate, and a group of a plurality of electrodes arranged in the relative movement direction on a surface side of the second substrate opposite to the group of electrets, the group of electrodes including first current collecting electrodes and second current collecting electrodes electrically connected to respective power supply loads to which power generated by the external vibration is supplied, and ground electrodes each provided between the first current collecting electrode and the second current collecting electrode and grounded.

11 Claims, 6 Drawing Sheets

(58) Field of Classification Search
USPC .......................................... 310/309; 322/2 A
See application file for complete search history.

(56) References Cited

U.S. PATENT DOCUMENTS

| | | | |
|---|---|---|---|
| 8,304,958 B2* | 11/2012 | Aoyagi | H02N 1/08 310/309 |
| 2008/0122313 A1 | 5/2008 | Mabuchi et al. | |
| 2012/0169179 A1* | 7/2012 | Masaki | H02N 1/08 310/300 |
| 2012/0181897 A1 | 7/2012 | Masaki et al. | |
| 2014/0077657 A1* | 3/2014 | Nakatsuka | H02N 1/10 310/309 |

FOREIGN PATENT DOCUMENTS

| | | |
|---|---|---|
| JP | 2011-254691 A | 12/2011 |
| JP | 2012-085515 A | 4/2012 |
| WO | 2011/021488 A1 | 2/2011 |

OTHER PUBLICATIONS

Takahashi et al. "Electret energy harvesting based on fringe electrical field change inside trenched ferroelectric" IEEE 24th International Conference on Micro Electro Mechanical Systems (MEMS), 2011, pp. 1305-1308.*
International Search Report issued in PCT/JP2013/066860 mailed on Aug. 6, 2013 (1 page).
Okamoto, H. et al.; "A Concept of an Electret Power Generator Integrated With a Rectifier"; PowerMEM2009, Washington DC, USA, Dec. 1-4, 2009, pp. 292-295 (4 pages).
Office Action in counterpart Chinese Patent Application No. 201380034408.4 issued on Jul. 26, 2016 (20 pages).

* cited by examiner

VIBRATION POWER GENERATOR

TECHNICAL FIELD

The present invention relates to a vibration power generator that generates power by external vibration utilizing an electret.

BACKGROUND ART

With the recent energy saving trends, attention has been paid to commonly available environmental energy that is independent of fossil fuels and the like. Power generation energy based on sunlight, wind power, or the like is widely known as environmental energy. Commonly available vibration energy may be environmental energy having no lower energy density than the above-described types of power generation energy.

Vibration power generators have been developed which generate power utilizing the vibration energy. An electret that can semipermanently retain charge is widely used for such power generators (see, for example, Non-patent Literature 1). This technique provides a power generator utilizing an electret and including a pair of opposite movable substrates that reciprocate in order to generate power, an electret on a surface of one of the substrates, and a pair of current collecting electrodes disposed on a surface of the other substrate to collect charge generated by the action of the electret. One of the pair of current collecting electrodes is grounded via a load resistor to which generated power is supplied. The other electrode is grounded without the use of a load resistor.

CITATION LIST

Non Patent Literature

[NPL 1]

Non-patent Literature 1: H. Okamoto, T. Suzuki, K. Mori and H. Kuwano, "A CONCEPT OF AN ELECTRET POWER GENERATOR INTEGRATED WITH A RECTIFIER", PowerMEMS2009, Washington D.C., USA, Dec. 1-4, 2009, pp. 292-295

SUMMARY OF INVENTION

Technical Problem

In conventionally developed vibration power generators utilizing an electret, electrodes that collect charge generated by the action of the electret are disposed opposite the electret. The electrodes are connected to a power supply load, to which power is to be supplied, to allow generated power to be utilized. In this regard, according to the conventional technique, a pair of electrodes is arranged on a substrate opposite to a substrate with the electret disposed thereon. One of the pair of electrodes is grounded without the use of a power supply load and only used as what is called a ground electrode.

Thus, charge is also collected on the one of the electrodes by the action of the electret. However, the charge is not supplied to the power supply load but migrates between the one of the electrodes and a ground surface. As a result, in terms of power supply to the power supply load, only one of the electrodes arranged on the substrate substantially serves to supply power to the power supply load. Thus, the utilization efficiency of the surfaces of the substrates is not preferable. In other words, the conventional technique fails to derive power generated by the action of the electret so as to allow the power to be efficiently supplied to the power supply load.

With the foregoing in view, it is an object of the present invention to provide a vibration power generator that enables power generated by the vibration power generator using an electret to be efficiently supplied to a power supply load.

Solution to Problem

To accomplish this object, the present invention provides a vibration power generator utilizing an electret and adopting an electrode configuration in which a pair of current collecting electrodes and a ground electrode are disposed on a substrate opposite to the electrets; the current collecting electrodes collecting generated power and the ground electrode being disposed between the current collecting electrodes. The vibration power generator also adopts a configuration in which a power supply load is connected to each of the pair of current collecting electrodes and grounded to allow the generated power to be supplied to the power supply load. Connecting the power supply load to each of the current collecting electrode enables power to be supplied to the power supply load. Disposing the ground electrode between the current collecting electrodes enables prevention of application of a voltage to a parasitic capacitance section present between the current collecting electrodes. This allows charge generated in the current collecting electrodes to be smoothly fed toward the power supply load side, enabling suitable power supply.

Specifically, the present invention provides a vibration power generator including a first substrate and a second substrate configured to be moved relative to each other by external vibration while remaining opposite each other, a group of a plurality of electrets arranged in the relative movement direction on one surface side of the first substrate, and a group of a plurality of electrodes arranged in the relative movement direction on a surface side of the second substrate opposite to the group of electrets, the group of electrodes including first current collecting electrodes and second current collecting electrodes electrically connected to respective power supply loads to which power generated by the external vibration is supplied, and ground electrodes each provided between the first current collecting electrode and the second current collecting electrode and grounded.

The vibration power generator according to the present invention utilizes the characteristics of electrets which allow charge to be semipermanently retained, whereby a variation in charge capacity, which results from the external variation between the group of electrodes and the group of electrets provided on the two substrates that can be moved relative to each other, is derived by the first and second current collecting electrodes and supplied to the power supply load. In the vibration power generator, the power supply load is connected to each of the first and second current collecting electrodes to allow charge collected by the current collecting electrode to be supplied to the power supply load. However, the applicant has made effort to find an event that hinders the flow of charge on the current collecting electrode into the power supply load.

In an electrode configuration in which the first current collecting electrodes and the second current collecting electrodes are arranged along the relative movement direction of the first substrate and the second substrate, an imaginary capacitance section in which charge is stored (parasitic capacitance section) is expected to be present between the first current collecting electrode and the second current collecting electrode. The parasitic capacitance section's capability of storing charge, that is, the parasitic capacitance, is expected to be significantly affected by the sizes of side surfaces (side end surfaces) of the adjacent substrates and the distance between the substrates. However, the presence of a parasitic capacitance of a given magnitude is expected to hinder the charge on the current collecting electrode from being migrated to the power supply load, restraining generated power from being efficiently supplied. When an increase occurs in a voltage applied to the parasitic capacitance section, that is, in the potential difference between the adjacent electrodes forming the parasitic capacitance section, the quantity of energy accumulated in the parasitic capacitance section increases. This restrains smooth supply of power to the power supply load, limiting the vibration power generator's capability of supplying power to the power supply load.

Thus, the vibration power generator according to the present invention adopts the configuration in which the ground electrode is disposed between the first current collecting electrode and the second current collecting electrode. The ground electrode between the current collecting electrodes is expected to produce a parasitic capacitance section between the first current collecting electrode and the ground electrode and between the second current collecting electrode and the ground electrode. The first current collecting electrode-side parasitic capacitance section is subjected to a potential difference between the first current collecting electrode and the ground electrode which result from a voltage drop at the power supply load connected to the first current collecting electrode. On the other hand, the second current collecting electrode-side parasitic capacitance section is subjected to a potential difference between the second current collecting electrode and the ground electrode which result from a voltage drop at the power supply load connected to the second current collecting electrode. As a result, this configuration enables reduction in the voltage (potential difference) to be applied to each parasitic capacitance section compared to a configuration with no ground electrode provided between the current collecting electrodes.

In general, the charge energy accumulated in the parasitic capacitance section is proportional to the square of the voltage applied to the parasitic capacitance section. With this taken into account, the above-described reduction in the voltage applied to each parasitic capacitance section reduces the degree of hindrance to the power supply from the current collecting electrode to the power supply load. This enables generated power to be suitably supplied to the power supply load.

The power supply load connected to each current collecting electrode may or may not be grounded as long as power is suitably supplied to the load. For example, as described below, when an output voltage from the vibration power generator is rectified and the rectified voltage is supplied to the power supply load, whether or not the power supply load needs to be grounded may be appropriately determined depending on the aspect of the corresponding rectifier.

In the vibration power generator in which the first current collecting electrodes and the second current collecting electrodes are arranged on the second substrate, each of the ground electrodes may be provided between each of some pairs of the first current collecting electrode and the second current collecting electrode. That is, when the ground electrode is disposed between the first current collecting electrode and the second current collecting electrode in order to reduce the degree of hindrance caused to the power supply to the power supply load by the parasitic capacitance section, an effective area on the second substrate for the electrodes that collect charge decreases (that is, the area occupied by the current collecting electrodes). This degrades the vibration power generator's capability of supplying power to the power supply loads. Thus, in view of the correlation between the decrease in the effective area for the electrodes as a result of disposition of the ground electrodes and the reduction in the degree of hindrance caused to the power supply by the parasitic capacitance section, the ground electrode may more preferably be disposed between each of some pairs of the first current collecting electrode and the second current collecting electrode so as to maximize the power supply capability of the vibration power generator with the correlation taken into account. In the present invention, even the adoption of such a configuration does not prevent the adoption of the configuration in which the ground electrode is disposed between each of all the pairs of the first current collecting electrode and the second current collecting electrode.

Furthermore, in the above-described vibration power generator, the ground electrode has a width, along the relative movement direction, which serves to maximize the amount of power supplied to the power supply loads connected to the first current collecting electrodes and the second current collecting electrodes, respectively. When the ground electrode is present between the first current collecting electrode and the second current collecting electrode as a grounded electrode, the degree of hindrance caused to the power supply by the parasitic capacitance section illustrated above decreases, but an increased electrode width reduces the effective area for the electrodes on the second substrate. Thus, the width of the ground electrode is preferably set so as to maximize the capability of supplying power to the power supply load. Furthermore, in view of maximization of the power supply capability of the vibration power generator, the spacing between the ground electrode and each of the first and second current collecting electrodes is preferably appropriately set in addition to the width of the ground electrode.

In another aspect, the width of the ground electrode is utilized in a different manner. In the above-described vibration power generator, the width of the ground electrode along the relative movement direction may be identical to the spacing between the first current collecting electrode and the ground electrode along the relative movement direction or the spacing between the second current collecting electrode and the ground electrode along the relative movement direction. The applicant has found that adoption of such a configuration may suitably improve the power supply capability of the vibration power generator according to the present invention.

In the above-described vibration power generator, the power supply loads electrically connected to the first and second current collecting electrodes, respectively, are configured to be grounded independently of each other so that power collected by each of the current collecting electrodes is supplied to the power supply load connected to the current collecting electrode.

Furthermore, in the configuration in which the first current collecting electrode and the second current collecting electrode are grounded via identical power supply loads, the first current collecting electrode and the second current collecting electrode may be connected to the power supply load via an identical rectifier. When each current collecting electrode and the power supply load are connected together via the rectifier, outputs from the current collecting electrodes can be suitably synthesized so that the synthesized power can be supplied to the power supply load. An example of the rectifier may be a full wave rectifier. Alternatively, the rectifier may be a both wave rectifier, and in that case, the first current collecting electrode and the second current collecting electrode may be connected to the power supply load via individually formed rectifiers.

Furthermore, in the above-described vibration power generator, the ground electrode may be grounded via a predetermined impedance circuit having a lower impedance than the power supply load. When the predetermined impedance circuit connected to the ground electrode has a lower impedance than the power supply load, the voltage applied to the parasitic capacitance section between the ground electrode and each current collecting electrode can be reduced to a relatively small value. Thus, power supply to the power supply load can be achieved with the degree of hindrance caused to the power supply by the parasitic capacitance section kept relatively low.

Additionally, in the above-described vibration power generator, the power supply load may be a load resistor, a capacitance, or the like provided that generated power is supplied to the load. More specifically, the power supply load may be a power storage circuit that accumulates supplied generated power, a load circuit that performs a predetermined operation using supplied generated power as a power supply (for example, a circuit including a sensor that detects a predetermined parameter or a wireless circuit that transmits the detected parameter), a voltage conversion circuit that coverts the voltage of the supplied generated power, or a combination of any of the power storage circuit, the load circuit, and the voltage conversion circuit.

Advantageous Effects of Invention

Power generated by a vibration power generator utilizing an electret can be efficiently supplied to a power supply load.

DESCRIPTION OF EMBODIMENTS

A vibration power generator 1 according to the present invention will be described below with reference to the drawings. Configurations of embodiments described below are illustrative, and the present invention is not limited to the configuration of the embodiments.

Example 1

Figure 1:
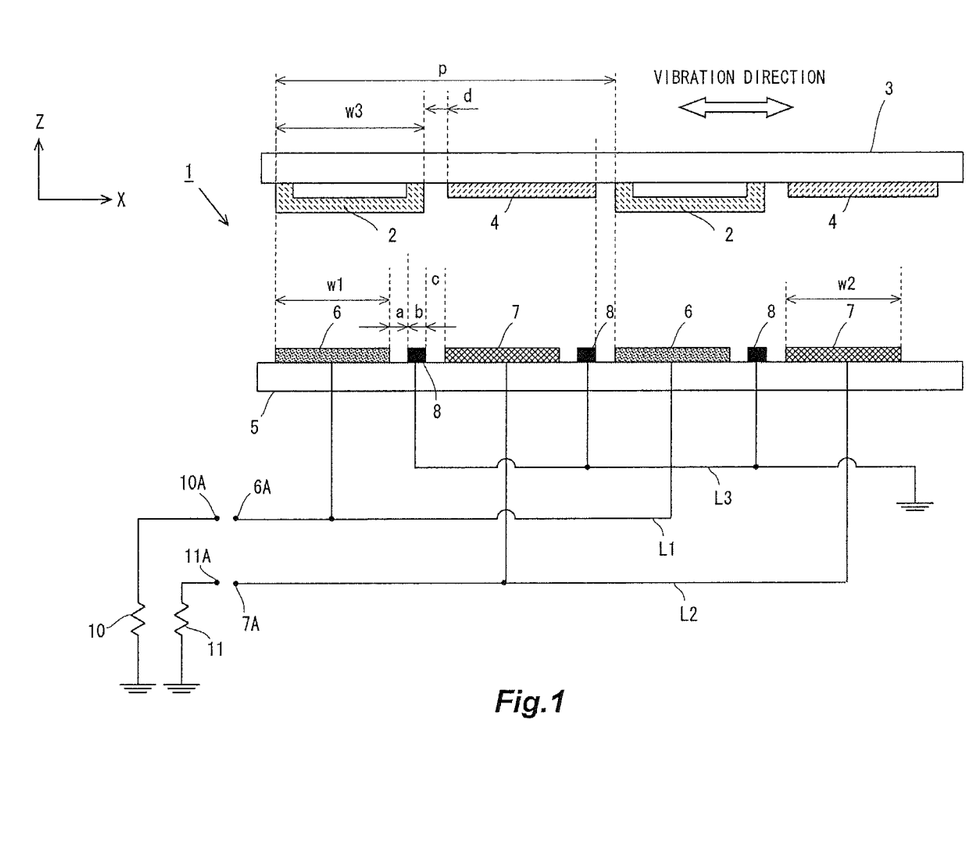
FIG. 1 is a diagram depicting a general configuration of a vibration power generator according to a first embodiment of the present invention.

FIG. 1 is a general configuration of the vibration power generator 1 according to the present invention. FIG. 1 is a vertical cross-sectional view of the vibration power generator 1, that is, a cross-sectional view of the vibration power generator 1 taken along a ZX plane. The vibration power generator 1 includes a first substrate 3 and a second substrate 5 both housed inside a housing not depicted in the drawings. The first substrate 3 and the second substrate 5 are configured to be able to move relative to each other while remaining opposite each other. In Embodiment 1, the second substrate 5 is fixed to the housing. In contrast, the first substrate 3 is connected at opposite ends thereof to the housing by springs and thus, the whole first substrate 3 is configured to move (vibrate) relative to the housing by external vibration externally applied to the vibration power generator 1. In FIG. 1, a vibration direction of the first substrate 3 is depicted by blanked arrows.

The first substrate 3 and the second substrate 5 are configured to be able to move relative to each other while remaining opposite and parallel to each other, in other words, while maintaining a constant spacing between opposite surfaces of the first and second substrates 3 and 5. Thus, charge generated by the action of electrets 2 on the first substrate 3 as described below can be collected by pairs of current collecting electrodes 6 and 7 on the second substrate 5, which can then supply the collected charge to load resistors 10 and 11 connected to the respective current collecting electrodes. The principle of power generation through the action of the electrets 2 is based on the conventional technique and is not described herein in detail. Furthermore, a configuration that retains a spacing between the first substrate 3 and the second substrate 5, that is, a configuration that allows smooth relative movement of the first and second substrates 3 and 5 to be maintained, is important for improving the efficiency of the power generation. However, such a configuration departs from the core of the present invention, and is thus not referred to below.

Now, the structure of the first substrate 3 side will be described. On a surface of the first substrate 3 opposite to the second substrate 5, a plurality of electrets 2 and a plurality of guard electrodes 4 each formed on a conductor are alternately arranged along a relative movement direction of the first substrate 3 and the second substrate 5 (vibration direction in FIG. 1). The plurality of electrets 2 corresponds to a group of electrets according to the present invention. The plurality of electrets 2 and the plurality of guard electrodes 4 are each shaped like a comb and nested. However, since FIG. 1 is a cross-sectional view taken along a ZX plane, the electrets 2 and the guard electrodes 4 are depicted to be alternately arranged. In Embodiment 1, the electrets 2 are configured to semipermanently retain negative charge. When the electrets 2 and the guard electrodes 4 are thus alternately arranged, the width of the electret 2 and the width of the guard electrode 4 in the relative movement direction are both denoted by w3. The spacing between the electret 2 and the guard electrode 4 in the relative movement direction is denoted by (d).

Now, the structure of the second substrate 5 will be described. On a surface of the second substrate 5 opposite to the first substrate 3, a group of electrodes is formed including a pair of electrodes (first current collecting electrode 6 and second current collecting electrode 7) which collects charge generated by the action of the electret 2 and which supplies power based on the charge to a load resistor and a ground electrodes 8 each disposed between the first current collecting electrode 6 and the second current collecting electrode 7. Specifically, the first current collecting electrode 6 and the second current collecting electrode 7 are formed on the second substrate 5 so as to be electrically insulated. The plurality of first current collecting electrodes 6 is aggregated to a terminal 6A via a wire L1 and connected to a grounded load resistor 10 via a terminal 10A. Moreover, the plurality of second current collecting electrodes 7 is aggregated to a terminal 7A via a wire L2 and connected to a grounded load resistor 11 via a terminal 11A. On the second substrate 5 between the first current collecting electrode 6 and second current collecting electrode 7 electrically formed as described above, a ground electrode 8 is disposed which is grounded directly via a wire L3 without the use of any load resistor. Thus, the ground electrode 8 does not serve to supply power to the load resistor and can thus be distinguished from the first current collecting electrode 6 and the second current collecting electrode 7.

For the group of electrodes thus formed on the second substrate 5, the w1 of the first current collecting electrode 6 and the width w2 of the second current collecting electrode 7 in the relative movement direction are set to the same value. Furthermore, the width (b) of the ground electrode 8, the spacing (a) between the first current collecting electrode 6 and the ground electrode 8, and the spacing (c) between the second current collecting electrode 7 and the ground electrode 8 are appropriately set such that the pitch of a set of electrode arrays repeated on the second substrate 5, that is, the pitch of the first current collecting electrode 6, the ground electrode 8, the second current collecting electrode 7, and the ground electrode 8, is the same p of a set of arrays repeated on the first substrate 3, that is, the pitch of the electret 2 and the guard electrode 4.

Figure 2:
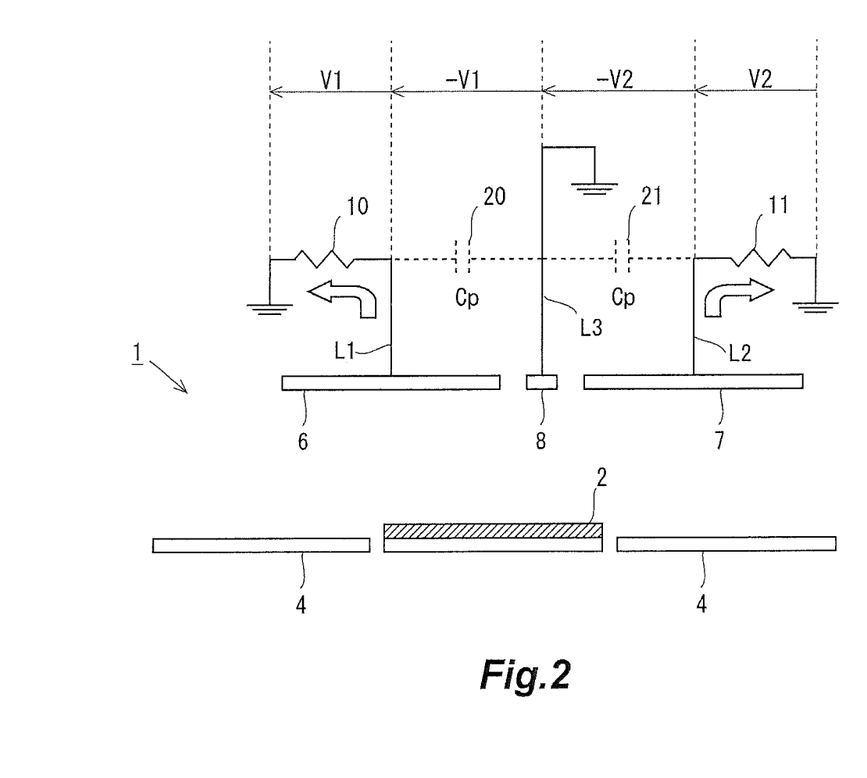
FIG. 2 is a model diagram of the vibration power generator depicted in FIG. 1.
Figure 3:
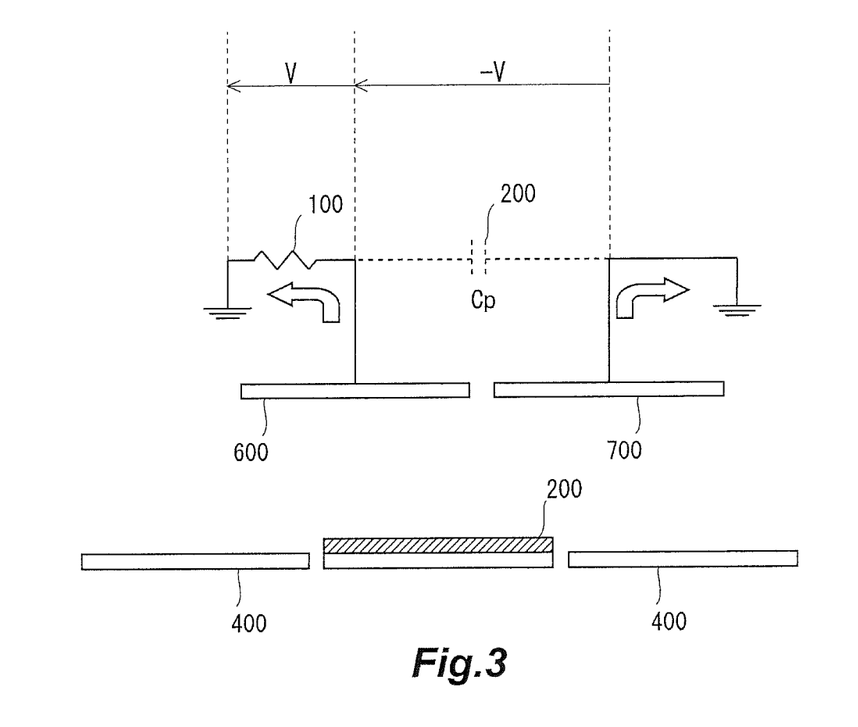
FIG. 3 is a model diagram of a vibration power generator according to a first reference example.

Power generation and power supply to the load resistors 10 and 11 in the vibration power generator 1 having the configuration depicted in FIG. 1 as described above will be described based on FIG. 2 and FIG. 3. FIG. 2 is a diagram depicting a parasitic capacitance between the current collecting electrode 1 and ground electrode depicted in FIG. 1 and a parasitic capacitance between the current collecting electrode 2 and ground electrode depicted in FIG. 1. Elements in FIG. 2 which are identical to corresponding components of the vibration power generator 1 depicted in FIG. 1 are denoted by reference numerals identical to the reference numerals of the components. Furthermore, FIG. 3 is a model diagram of a vibration power generator according to a reference example for a comparison with the vibration power generator 1 depicted in FIG. 2. In the reference example depicted in FIG. 3, electrodes corresponding to the first current collecting electrode 6 and the second current collecting electrode 7 are formed as a first current collecting electrode 600 and a second current collecting electrode 700, respectively. However, only the first current collecting electrode 600 is connected to a load resistor 100 to which power is supplied, with the second current collecting electrode 700 directly grounded. Additionally, in the reference example depicted in FIG. 3, no configuration corresponding to the ground electrode 8 depicted in FIG. 2 is present. A configuration for electrets 200 and guard electrodes 400 provided on a substrate opposite to a current collecting electrode-side substrate is the same as the configuration for the electrets 2 and the guard electrodes 4 depicted in FIG. 2.

Both in the vibration power generator 1 depicted in FIG. 2 and in the reference example depicted in FIG. 3, a parasitic capacitance section 20, 21, or 200 that is an imaginary capacitance section acting to hinder migration of charge from the electrodes is present between adjacent electrodes of the group of electrodes formed on the second substrate 5. The capacitance of the parasitic capacitance section 20 or the like (hereinafter simply referred to as the "parasitic capacitance") is in principle determined based on the shape of an end surface of the adjacent electrode, the thickness of the electrode, the number of electrodes, the length of the electrode, the dielectric constant of the substrate, the electrode spacing, and the like. In the vibration power generator 1 depicted in FIG. 2, the spacing (a) between the first current collecting electrode 6 and the ground electrode 8 is the same as the spacing (c) between the second current collecting electrode 7 and the ground electrode 8, and also end surfaces of the respective electrodes has the same shape and size. Thus, the parasitic capacitance section 20 present between the first current collecting electrode 6 and the ground electrode 8 has a parasitic capacitance Cp, which is the same as the parasitic capacitance of the parasitic capacitance section 21 present between the second current collecting electrode 7 and the ground electrode 8; the parasitic capacitance is denoted by Cp. Furthermore, the reference example depicted in FIG. 3 is the same as the example depicted in FIG. 2 in the electrode spacing between the first current collecting electrode 600 and the second current collecting electrode 700 and the shape and size of the end surface of the electrode. Thus, the parasitic capacitance section 200 present between the first current collecting electrode 600 and the second current collecting electrode 700 also has a parasitic capacitance Cp.

First, the reference example depicted in FIG. 3 will be described. In the reference example depicted in FIG. 3, the load resistor 100 is supplied only with power based on the charge collected by the first current collecting electrode 600, whereas the charge collected by the second current collecting electrode 700 only migrates back and forth between the second current collecting electrode 700 and the ground surface. Thus, in the reference example, although the two types of current collecting electrodes are provided, only the first current collecting electrode 600 substantially supplies power to the load resistor 100, resulting in inefficient power supply from the current collecting electrodes. Furthermore, when a voltage drop at the load resistor 100 occurring when the load resistor 100 is supplied with power is assumed to be equal to V, a voltage of −V is applied to the parasitic capacitance section 200 present between the first current collecting electrode 600 and the second current collecting electrode 700. Therefore, energy resulting from the applied voltage of −V can be accumulated in the parasitic capacitance section 200. This hinders the power supply from the first current collecting electrode 600 to the load resistor 100 depending on the accumulated energy.

On the other hand, in the vibration power generator 1 depicted in FIG. 2, power based on the charge collected by the first current collecting electrode 6 is supplied to the load resistor 10. Power based on the charge collected by second current collecting electrode 7 is supplied to load resistor 11. Thus, in the vibration power generator 1, each of the two types of current collecting electrodes supplies power to the load resistor connected to the current collecting electrode. Thus, the vibration power generator 1 as a whole can achieve efficient power supply via the current collecting electrodes compared to the vibration power generator in the reference example.

Furthermore, as is the case with the reference example, the impact of the parasitic capacitance sections 20 and 21 in the vibration power generator 1 will be discussed. When a voltage drop at the load resistor 10 occurring when the first current collecting electrode 6 supplies power to the load resistor 10 is assumed to be equal to V1, a voltage of −V1 is applied to parasitic capacitance section 20 present between the first current collecting electrode 6 and the ground electrode 8 because the ground electrode 8 is grounded. Thus, energy resulting from the applied voltage of −V1 can be accumulated in the parasitic capacitance section 20. This hinders the power supply (charge migration) from the first current collecting electrode 6 to the load resistor 10 depending on the accumulated energy. On the other hand, when a voltage drop at the load resistor 11 occurring when the second current collecting electrode 7 supplies power to the load resistor 11 is assumed to be equal to V2, a voltage of −V2 is applied to parasitic capacitance section 21 present between the second current collecting electrode 7 and the ground electrode 8 because the ground electrode 8 is grounded. Thus, energy resulting from the applied voltage of −V2 can be accumulated in the parasitic capacitance section 21. This hinders the power supply (charge migration) from the second current collecting electrode 7 to the load resistor 11 depending on the accumulated energy.

Thus, in the vibration power generator 1, the first current collecting electrode 6 and the second current collecting electrode 7 supply power to the corresponding load resistors 10 and 11 as described above, but the parasitic capacitance sections 20 and 21 present between each current collecting electrode and the ground electrode hinders the corresponding power supply. However, since the reference example depicted in FIG. 3 involves the power supply only from the first current collecting electrode 600 and the hindrance caused to the power supply by the parasitic capacitance section 200 between the current collecting electrodes, the power supply capability of the vibration power generator 1 as a whole significantly exceeds the power supply capability in the reference example. For example, when it is assumed that the load resistors 10, 11, and 100 have the same resistance value and that similar voltage drops occur at the load resistors during power generation based on external vibration, the power supply capability of the vibration power generator 1 as a whole may be about twice as high as the power supply capability in the reference example.

Figure 4:
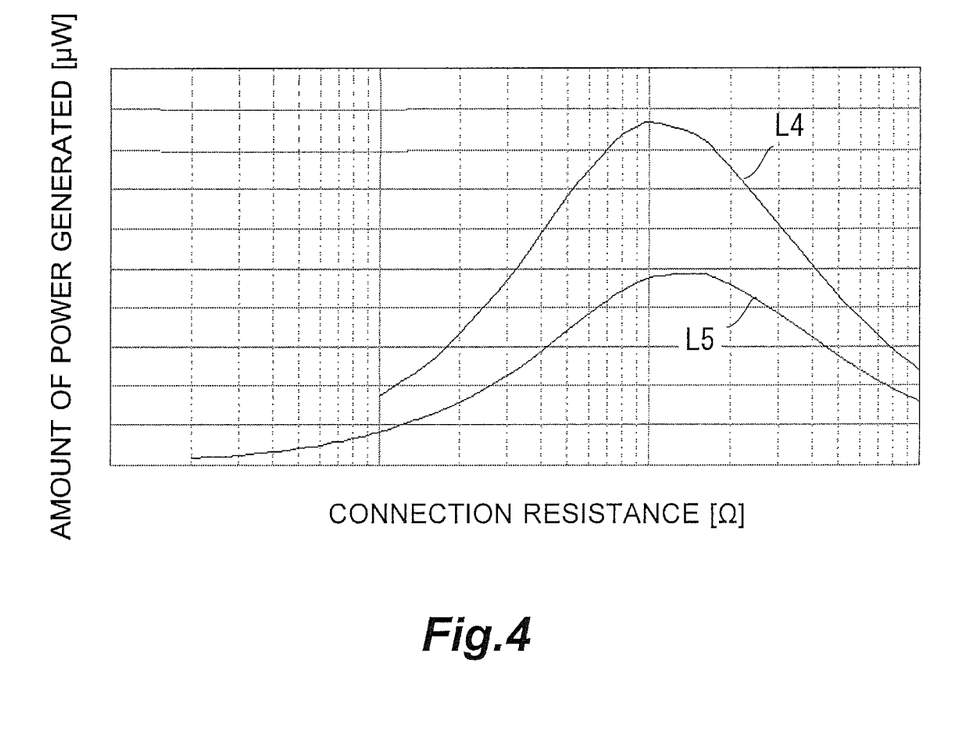
FIG. 4 is a diagram of a comparison, in terms of the amount of power generated, between the vibration power generator depicted in FIG. 1 and the vibration power generator depicted in FIG. 3.

More specifically, FIG. 4 includes a graph L4 depicting the correlation between the power supply capability (the amount of power generated) of the vibration power generator 1 and the resistance values of the load resistors 10 and 11 and a graph L5 depicting the correlation between the power supply capability (the amount of power generated) and the resistance value of the load resistor 100 in the reference example. In the graph shown in FIG. 4, the resistance values of the load resistors 10 and 11 of the vibration power generator 1 are the same. As seen in FIG. 4, the power supply capability (the amount of power generated) of the vibration power generator 1 and the power supply capability (the amount of power generated) in the reference example vary in accordance with the resistance values of the load resistors, but when the resistance values of the load resistors are fixed in both cases, the power supply capability (the amount of power generated) of the vibration power generator 1 is about 1.7 times as high as the power supply capability (the amount of power generated) in the reference example. It may thus be understood that the power supply capability of the vibration power generator 1 according to the present invention is significantly high.

As depicted in FIG. 1 and FIG. 2, on the second substrate 5 in the vibration power generator 1, the first current collecting electrode 6 and the second current collecting electrode 7 are related directly to power supply but the ground electrode 8 is not connected to the load resistor and is thus not related directly to power supply. Therefore, for the group of electrodes formed on the second substrate 5, the area occupied by the current collecting electrodes decreases with increasing area occupied by the ground electrodes 8, leading to a degraded power supply capability of the vibration power generator 1.

Thus, for example, the width (b) of the ground electrode 8 is preferably set as small a value as possible within the range of values at which the ground electrode 8 can be manufactured so as to maximize the capability of supplying power to the load resistors 10 and 11 connected to the first current collecting electrode 6 and the second current collecting electrode 7, respectively.

<Variation>

In the configuration of the vibration power generator 1 depicted in FIG. 1, the ground electrode 8 is disposed at each of the points between the first current collecting electrodes 6 and the second current collecting electrodes 7. However, the power supply capability of the vibration power generator 1 is degraded by an increase in the area occupied by the ground electrodes 8 as described above, the ground electrode may be disposed at some of the points between the first current collecting electrodes 6 and the second current collecting electrodes 7. In this regard, omission of the ground electrodes 8 from some of points between the first and second current collecting electrodes 6 and 7 enhances the effect of the parasitic capacitance section at these points between the first current collecting electrode 6 and the second current collecting electrode 7. Thus, how many ground electrodes 8 are disposed at the points between the first current collecting electrodes 6 and the second current collecting electrodes 7 is preferably determined taking into account the correlation between an increased area occupied by the current collecting electrodes and the impact of the parasitic capacitance sections, resulting from the omission of the ground electrodes 8.

Example 2

Figure 5:
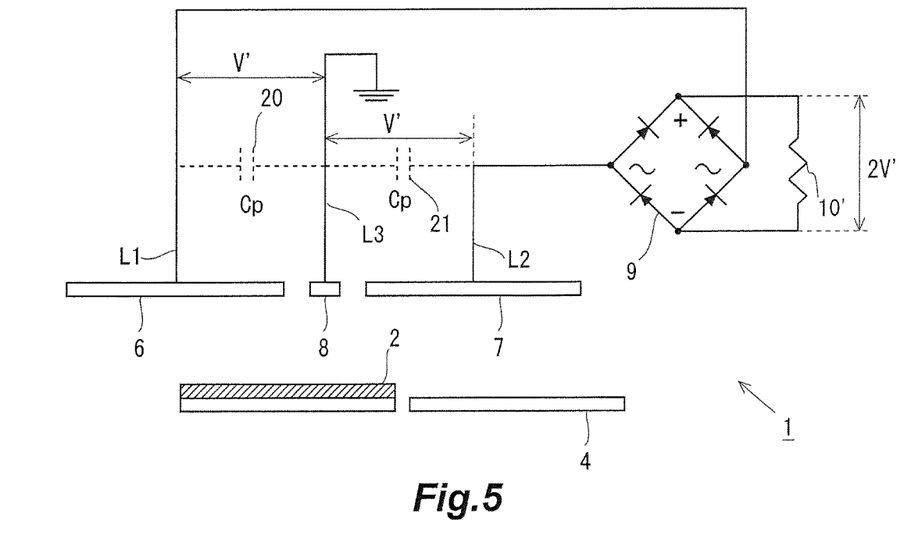
FIG. 5 is a model diagram of a vibration power generator according to a second embodiment of the present invention.

FIG. 5 depicts a model configuration of a second embodiment according to a vibration power generator 1 of the present invention. The model configuration depicted in FIG. 5 differs from the model configuration depicted in FIG. 2 in a configuration for a load resistor connected to a first current collecting electrode 6 and a second current collecting electrode 7. Specifically, in the model configuration depicted in FIG. 5, the first current collecting electrode 6 and the second current collecting electrode 7 are connected to two respective input terminals of a bridge full-wave rectifier 9. A load resistor 10' is connected to output terminals of the bridge full-wave rectifier 9. Thus, in the model configuration depicted in FIG. 5, power based on charge collected by the first current collecting electrode 6 and power based on charge collected by the second current collecting electrode 7 are synthesized via the bridge full-wave rectifier 9. The synthesized power is then supplied to the load resistor 10'. The configuration of the first current collecting electrode 6, the second current collecting electrode 7, the ground electrode 8, the electret 2, and the like is the same as the model configuration depicted in FIG. 2.

Also in the thus configured vibration power generator 1, parasitic capacitance sections 20 and 21 are present between the first current collecting electrode 6 and a ground electrode 8 and between the second current collecting electrode 7 and the ground electrode 8 as is the case with the model configuration depicted in FIG. 2. When a voltage applied to each of the parasitic capacitance sections when power is supplied to the load resistor 10' is assumed to be equal to V', an inter-terminal voltage 2V' is applied to the load resistor 10' due to the synthesis action performed on the input voltage by the bridge full-wave rectifier 9.

Figure 6:
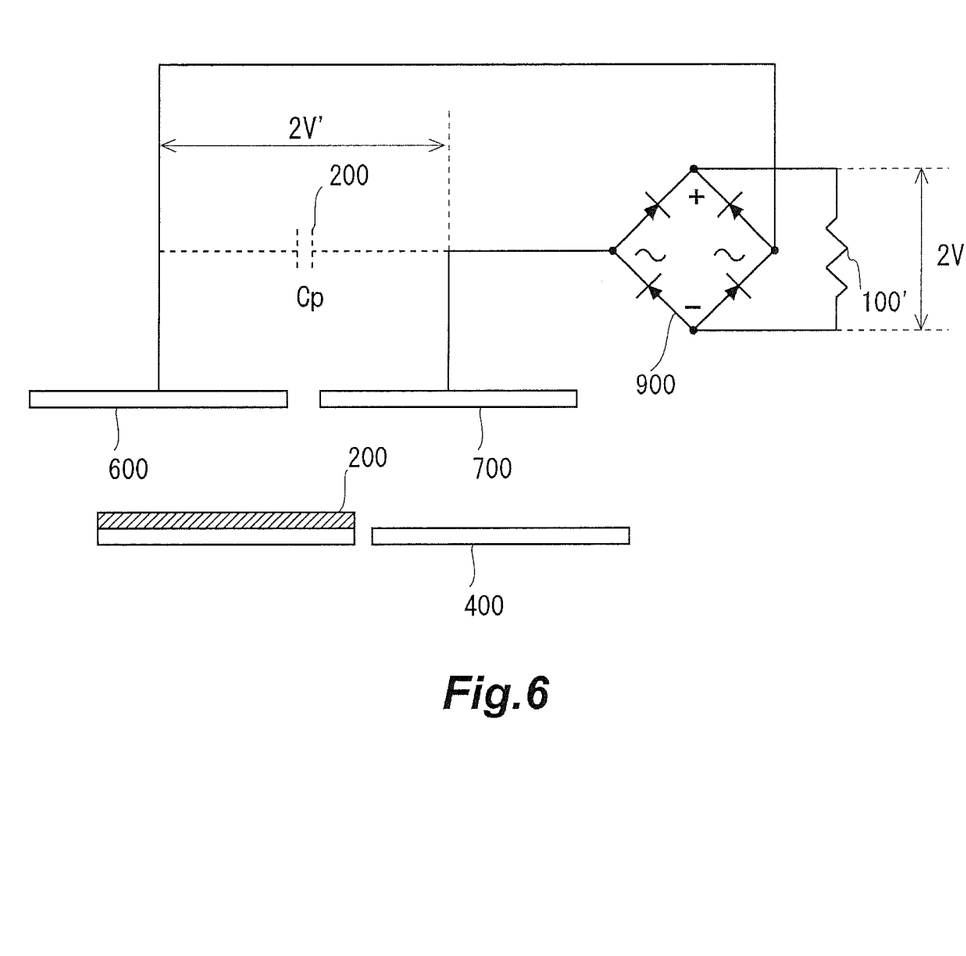
FIG. 6 is a model diagram of a vibration power generator according to a second reference example.

Here, a model configuration according to a reference example for a comparison with the model configuration depicted in FIG. 5 is depicted in FIG. 6. As is the case with the model configuration depicted in FIG. 3, the model configuration depicted in FIG. 6 does not include the configuration depicted in FIG. 2 and FIG. 5 and corresponding to the ground electrode 8. For a comparison with FIG. 5, a configuration for connections between a load resistor 100' and each of a first and a second current collecting electrodes 600 and 700 is substantially the same as the corresponding configuration depicted in FIG. 5. That is, also in the reference example in FIG. 6, the first current collecting electrode 600 and the second current collecting electrode 700 are connected to two respective input terminals of a bridge full-wave rectifier 900, and the load resistor 100' is connected to output terminals of the bridge full-wave rectifier 900.

In the thus configured reference example, a parasitic capacitance section 200 is present between the first current collecting electrode 600 and the second current collecting electrode 700 as is the case with the model configuration depicted in FIG. 3. Moreover, as is the case with the vibration power generator 1 shown in FIG. 5, when it is assumed that a voltage of 2V' is applied to the load resistor 100' due to the synthesis action of the bridge full-wave rectifier 900, a voltage of 2V' is also applied to the parasitic capacitance section 200.

As described above, in the vibration power generator 1 according to the present invention depicted in FIG. 5, the synthesis action performed on the outputs by the bridge full-wave rectifier 9 allows generated power to be aggregated to the load resistor 10', while limiting the voltage applied to the parasitic capacitance sections 20 and 21 to V'. On the other hand, in the reference example, the synthesis action performed on the outputs by the bridge full-wave rectifier 9 allows generated power to be aggregated to the load resistor 10', but the voltage applied to the parasitic capacitance section 200 is double the voltage in the example depicted in FIG. 5. In general, energy accumulated in the capacitance section is proportional to the square of the applied voltage. Thus, although the vibration power generator 1 depicted in FIG. 5 involves more parasitic capacitance sections than in the reference example, the vibration power generator as a whole enables reduction in the degree of hindrance caused to the power supply to the load resistor by the parasitic capacitance sections 20 and 21. This enables more efficient power supply to be achieved.

<Variation>

In FIG. 5, a both-wave rectifier may be adopted instead of the full-wave rectifier 9. The technique relating to the both-wave rectifier is well known, and thus, the illustration of the configuration of the both-wave rectifier is omitted. In the both-wave rectifier, power supply loads connected through the both-wave rectifier include a power supply load connected to a positive synthesized output from the first current collecting electrode 6 and the second current collecting electrode 7, and a power supply load connected to a negative synthesized output from the first current collecting electrode 6 and the second current collecting electrode 7.

Example 3

In Embodiment 1 and Embodiment 2, the ground electrode 8 in the vibration power generator 1 is directly grounded without the use of any resistor or the like. Instead, the ground electrode 8 may be grounded via a resistor with a relatively small resistance value. More specifically, the ground electrode 8 may be grounded via a resistor having a smaller resistance value than the load resistors 10 and 11 connected to the first current collecting electrode 6 and the second current collecting electrode 7. Even in such a case, the degree of hindrance caused to the power supply by the parasitic capacitance sections 20 and 21 can be reduced as long as the voltage applied to the parasitic capacitance section 20 between the first current collecting electrode 6 and the ground electrode 8 and to the parasitic capacitance section 21 between the second current collecting electrode 7 and the ground electrode 8 can be kept low.

Other Embodiments

In the above-described vibration power generator 1, generated power is supplied to the load resistors 10 and 11. However, any of various types of loads can be adopted as a power supply load provided that the load can utilize power generated by the vibration power generator 1. For example, a capacitor (power storage circuit) that stores generated power or a voltage conversion circuit that converts the voltage of the generated power can be adopted as a power supply load. Alternatively, the power supply load may be a driving circuit (power supply circuit) for a sensor that detects an environment parameter (for example, temperature, humidity, or acceleration) for surroundings of an area where the vibration power generator 1 is installed, or may be a transmission circuit (regardless of whether the circuit is wireless or wired) that transmits the detected environment parameter to an external server.

REFERENCE SIGNS LIST

1 Vibration power generator
2 Electret
3 First substrate
4 Guard electrode
5 Second substrate
6 First current collecting electrode
7 Second current collecting electrode
8 Ground electrode
9 Rectifier
10, 10', 11 Load resistor
20 Parasitic capacitance section
L1, L2, L3 Wire

The invention claimed is:

1. A vibration power generator comprising:
    a first substrate and a second substrate configured to be moved relative to each other by external vibration while remaining opposite each other;
    a group of a plurality of electrets arranged in the relative movement direction on one surface side of the first substrate; and
    a group of a plurality of electrodes arranged in the relative movement direction on a surface side of the second substrate opposite to the group of electrets, the group of electrodes including first current collecting electrodes and second current collecting electrodes electrically connected to respective power supply loads to which power generated by the external vibration is supplied, and ground electrodes each provided between the first current collecting electrode and the second current collecting electrode and grounded.

2. The vibration power generator according to claim 1, wherein, as the first substrate and the second substrate are moved relative to each other by the external vibration, power is supplied to the power supply loads connected to the first current collecting electrodes and the second current collecting electrodes, respectively.

3. The vibration power generator according to claim 1, wherein each of the ground electrodes is provided between each of some pairs of the first current collecting electrode and the second current collecting electrode included in the first current collecting electrodes and the second current collecting electrodes arranged on the second substrate.

4. The vibration power generator according to claim 1, wherein the ground electrodes have a width, along the relative movement direction, which serves to maximize an amount of power supplied to the power supply loads connected to the first current collecting electrodes and the second current collecting electrodes, respectively.

5. The vibration power generator according to claim 1, wherein the first current collecting electrode and the second current collecting electrode are connected to the power supply loads via an identical rectifier.

6. The vibration power generator according to claim 5, wherein the rectifier is a full wave rectifier.

7. The vibration power generator according to claim 1, wherein the first current collecting electrode and the second current collecting electrode are connected to the power supply loads via individually formed rectifiers.

8. The vibration power generator according to claim 7, wherein the rectifier is a both wave rectifier.

9. The vibration power generator according to claim 1, wherein the power supply load electrically connected to the first current collecting electrode and the power supply load electrically connected to the second current collecting electrode are grounded independently of each other.

10. The vibration power generator according to claim 1, wherein the ground electrode is grounded via a predetermined impedance circuit with a lower impedance than the power supply load.

11. The vibration power generator according to claim 1, wherein the power supply load is a power storage circuit that stores supplied generated power, a load circuit that performs a predetermined operation using the supplied generated power as a power supply, a voltage conversion circuit that converts a voltage of the supplied generated power, or a combination of any of the power storage circuit, the load circuit, and the voltage conversion circuit.

* * * * *